United States Patent [19]

Hansen

[11] 4,022,301

[45] May 10, 1977

[54] SPRING-APPLIED ELECTROMAGNETICALLY-RELEASED BRAKE

[75] Inventor: Quinten A. Hansen, Franksville, Wis.

[73] Assignee: Scott Brake, Inc., Yorkville, Ill.

[22] Filed: Dec. 29, 1975

[21] Appl. No.: 645,204

[52] U.S. Cl. .............................. 188/72.1; 188/72.7; 188/166; 188/171; 192/70.23; 192/70.27; 192/89 A; 310/77; 318/372
[51] Int. Cl.² .................. F16D 55/30; B60T 13/04
[58] Field of Search ............. 188/72.1, 72.3, 72.7, 188/166, 167, 170, 171, 173; 318/372; 310/76, 77, 92; 192/89 A, 90, 70.23, 70.27; 74/107, 99 A

[56] References Cited

UNITED STATES PATENTS

| 934,688 | 9/1909 | Mueller et al. | 74/107 |
|---|---|---|---|
| 1,438,486 | 12/1922 | Gorman | 192/89 A X |
| 2,059,244 | 11/1936 | Kiekhaefer | 188/72.3 X |
| 3,365,031 | 1/1968 | Swift | 188/72.7 X |
| 3,463,274 | 8/1969 | Hollnagel et al. | 74/107 X |
| 3,556,266 | 1/1971 | McCarthy | 188/171 |
| 3,608,658 | 9/1971 | Woodfill et al. | 74/99 A X |

Primary Examiner—George E. A. Halvosa
Attorney, Agent, or Firm—Ira Milton Jones & Associates

[57] ABSTRACT

A spring-applied, electromagnetically-released brake for electric motors of the type wherein a disc that rotates with the shaft of the motor is gripped between non-rotating jaws, and wherein the grip exerted by the jaws is released by relative rotation between an inclined cam track and a cam follower riding thereon produced by energization of the electromagnet.

13 Claims, 3 Drawing Figures

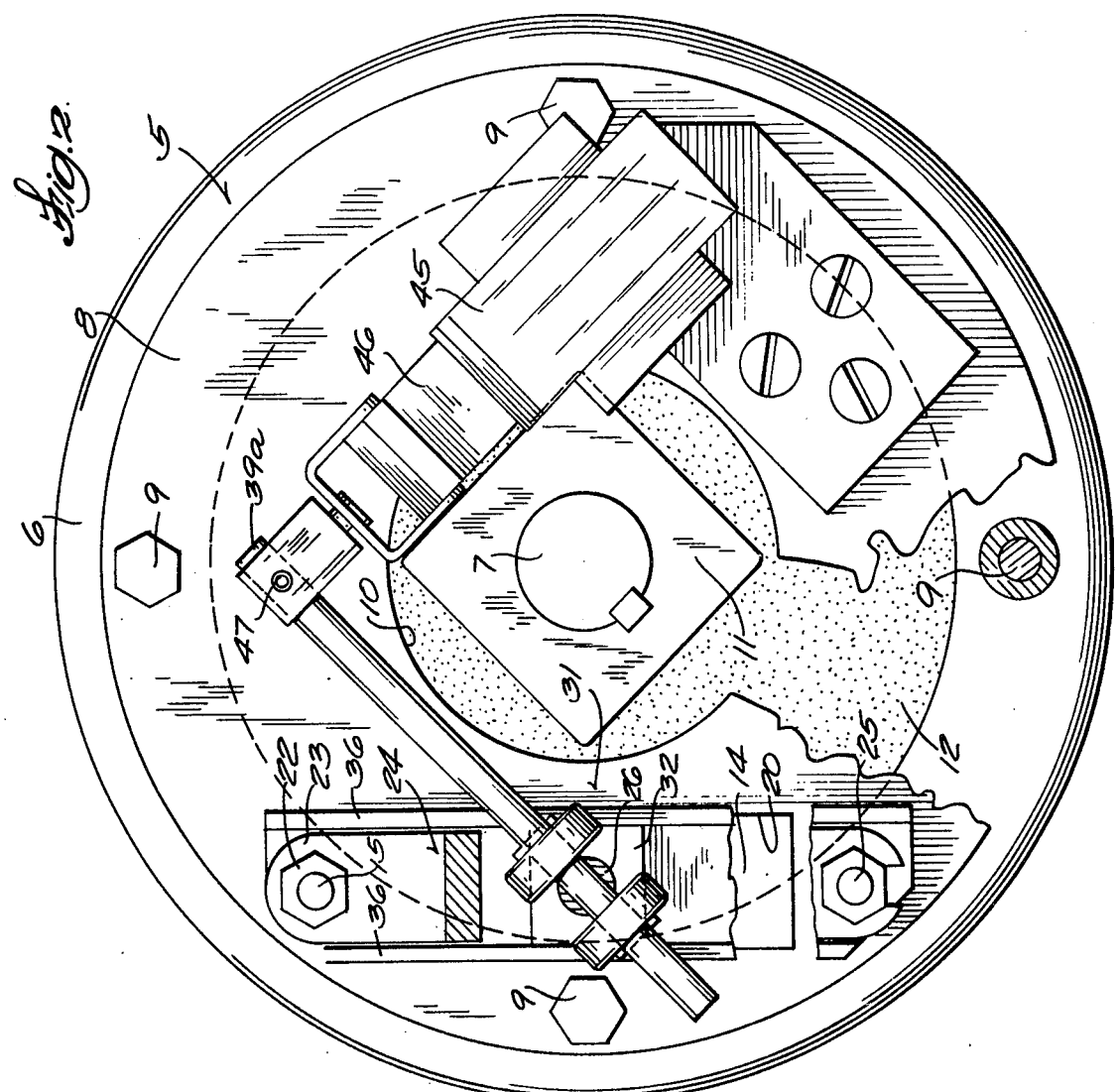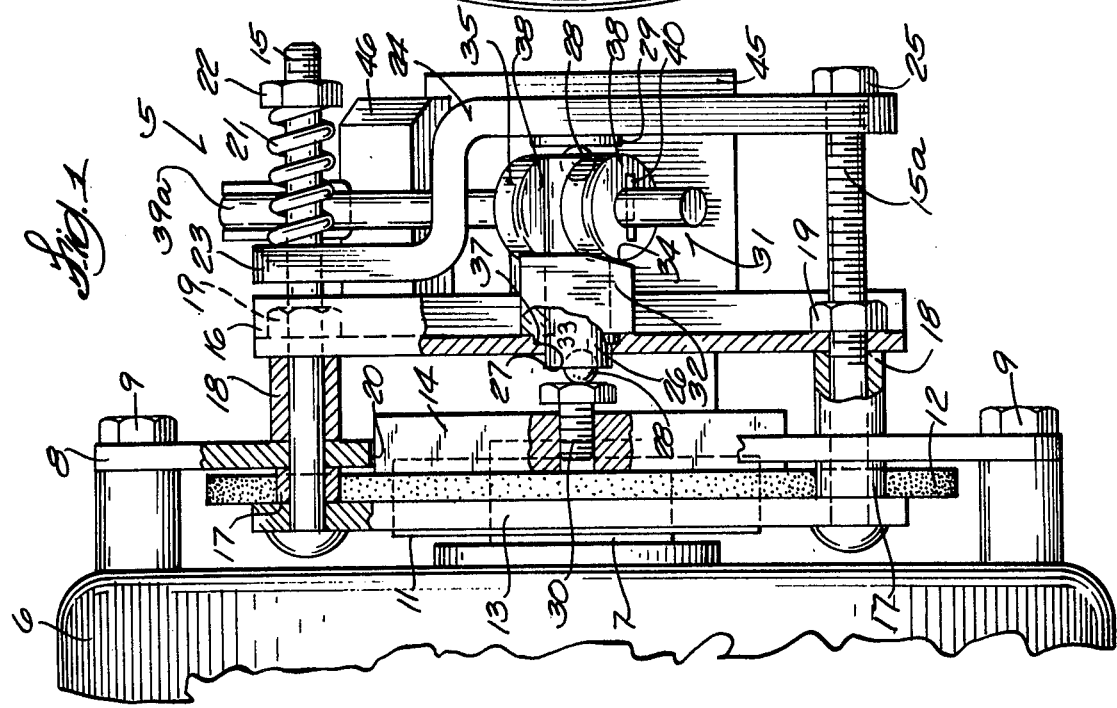

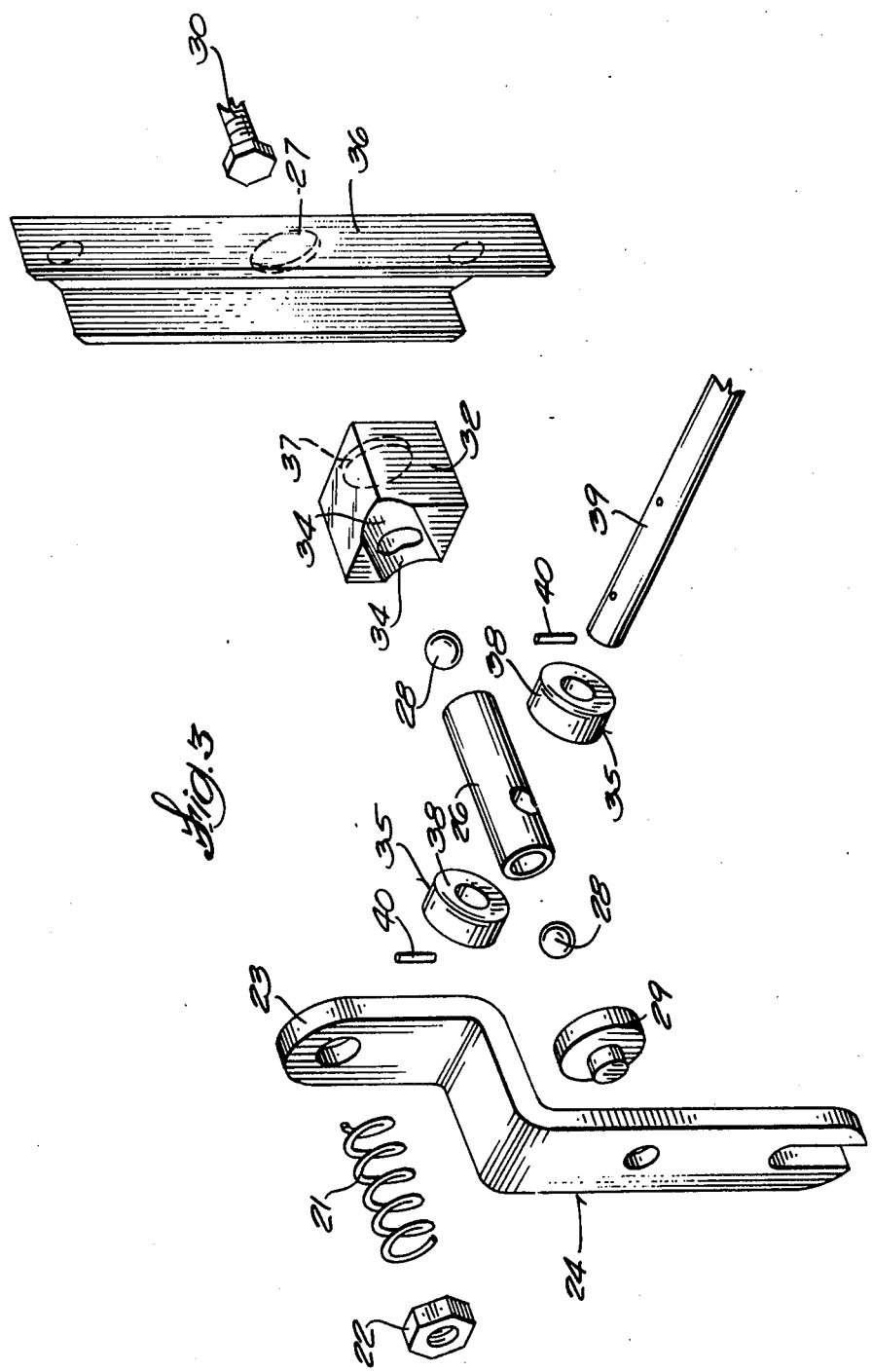

SPRING-APPLIED ELECTROMAGNETICALLY-RELEASED BRAKE

This invention relates to brakes especially adapted for use on electric motors and by which rotation of the motor shaft can be abruptly stopped the instant power to the motor is shut off. Brakes for this purpose generally have at least one disc of material having a high coefficient of friction connected in torque transmitting relation with the motor shaft and arranged to be gripped between a pair of non-rotatable jaws that are forced towards one another by one or more strong springs. Brake releasing mechanism activated by energization of an electromagnet opposes the spring force to disengage the brake. Hence by effecting energization and deenergization of the electromagnet concomitantly with connection and disconnection of the motor with its power source, the brake is released the instant the motor starts and applied to abruptly stop rotation of the motor shaft the instant power to the motor is shut off.

Brakes that operate in the aforesaid manner have been available for some time. Examples thereof will be found in the Hansen U.S. Pat. No. 3,221,845 and the McCarthy U.S. Pat. Nos. 3,500,971, 3,525,424, 3,556,266 and 3,605,958.

In comparison with heretofore available brakes of this type, the brake of the present invention is a substantial improvement. It is especially distinguished by simplicity of design and rugged construction, significantly reduced cost of production and exceptional reliability.

The purpose and object of this invention is therefore simply to provide a better than heretofore available spring-engaged and electromagnetically disengaged brake for use with electric motors.

Briefly stated, the invention achieves its purpose by a unique way of applying the brake-energizing spring force to the clamping jaws and in the way electromagnetically activated cam means relieve the jaws of that force. To be more specific, the invention resides in the combination with non-rotating inner and outer jaws between which the disc on the motor shaft is gripped and which are symmetrically disposed with respect to an axis passing perpendicularly through the disc, of rigid structure fixed with respect to the inner one of the jaws and having a part thereof which is intersected by that axis of symmetry positioned to have the outer jaw disposed between it and the inner jaw; a lever having a medial portion intersected by said axis and disposed outwardly of the outer jaw; means hingedly connecting one end of the lever with said rigid structure and providing for movement of the medial portion of the lever towards and from the jaws; spring means reacting between the free end portion of the lever and the rigid structure in the direction to force the medial portion of the lever towards the jaws; a post extending along said axis and axially interposed between the medial portion of said lever and the outer jaw to apply the spring force to the outer jaw and thereby cause the brake to be energized; cam means arranged to react between said post and said part of the rigid structure and upon activation thereof to impart brake releasing motion to the post; and means for activating the cam means.

With these observations and objectives in mind, the manner in which the invention achieves its purpose will be appreciated from the following description and the accompanying drawings which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 1 is a side view of the brake illustrating the same mounted on an electric motor and having parts broken away and shown in section;

FIG. 2 is an end view of the brake; and

FIG. 3 is an exploded perspective view of the elements that together comprise the heart of the invention.

Referring to the drawings, the numeral 5 designates generally the entire brake mechanism mounted on one of the end bells of an electric motor 6 from which its drive shaft 7 projects. The brake mechanism is mounted on a circular base plate 8 that is detachably fixed to the motor in spaced relationship by four studs 9. A hole 10 in the base plate accommodates the motor shaft.

A square hub 11 that is fixed to the motor shaft 7 in torque transmitting relation thereto, mounts a circular disc 12 in a manner allowing the disc freedom to move axially with respect to the motor shaft, but of course not rotationally. This disc is made of material having a high coefficient of friction and has a chordal portion or segment thereof received between a pair of inner and outer jaws 13 and 14, respectively. Both of these jaws are essentially elongated steel bars and are mounted on the base plate 8 in superimposed relation with their longitudinal axes disposed chordwise with respect to the circular disc 12. The inner jaw is located between the motor and the disc 12 at a fixed distance inwardly of the base plate to which it is secured by two screws 15 and 15a. These screws pass through aligned holes in the end portions of the inner jaw, the base plate and the end portions of a beam 16. Tubular spacers 17 on the screws between the inner jaw and the base plate space these parts from one another in parallel overlying relation, and longer tubular spacers 18 hold the beam 16 in outwardly spaced parallel relation with the base plate and the jaws. Since the heads of the screws 15–15a bear against the inner face of the inner jaw 13, the tightening of nuts 19 that are threaded onto the screws and bear against the beam, secures these assembled parts into a rigid structure in which the base plate 8 and the beam 16 respectively form inner and outer overlying spaced apart rigid members.

The inner jaw is fixed with respect to that rigid structure; the outer jaw is not. It is held in place in opposing relation to the fixed inner jaw by being seated in a rectangular hole 20 in the base plate 8. This hole has substantially the same shape, but is slightly larger than the outer jaw 14. While the resulting relatively loose connection of the outer jaw with the base plate allows it a degree of edgewise freedom so that it may be regarded as a floating jaw, it nevertheless coacts with the inner fixed jaw to grip the chordal portion or segment of the disc 12 upon the application of inwardly directed force onto the floating jaw.

This force is derived from a relatively heavy compression spring 21 encircling the screw 15 and confined between a nut 22 threaded on the outer end portion of this screw and the free end portion 23 of a lever 24.

The opposite end of this lever is hingedly connected with the outer end portion of the screw 15a, for which purpose the lever is bifurcated and straddles the screw under a nut 25 threaded onto the outer end of the screw.

The free end portion 23 of the lever, which is inwardly offset from the remainder of the lever to provide room for the spring, has a hole therethrough to freely slidably accommodate the screw 15.

A strut or post 26 axially interposed between the medial portion of the lever 24 and the floating jaw 14 transmits the force of the spring 21 to this jaw to clamp the disc solidly between it and the fixed jaw. A hole 27 in the beam accommodates the post. The post 26 is cylindrical and has sockets in its ends in which ball bearings 28 are seated to provide the axial extremities of the post. While the ball bearing in the end of the post adjacent to the lever 24 can engage the lever directly, it is preferable to effect that engagement through a brass thrust pad 29 set into the lever.

The ball bearing in the opposite end of the post bears against the head of a set screw 30 threaded into the floating jaw 14. Obviously the set screw enables adjustment of the effective length of the force transmitting connection between the lever and the jaw 14. That adjustment plus the adjustment of the spring force obtained by adjusting the nut 22 on the screw 15 enables the braking force to be set at any desired magnitude.

To enable the brake to be released or disengaged, electromagnetically actuated cam means — designated generally by the numeral 31 — is provided. This cam means comprises a cam block 32 seated on the beam 16 in line with the hole 27, and having a bearing-forming hole 33 therethrough in which the post 26 is received. On its outer surface that faces towards the lever, the block 32 has two inclined cam surfaces 34 that partially encircle the post at diametrically opposite sides thereof with their inclines facing in the same circumferential direction. Cam followers 35 that project radially from the post 26 at diametrically opposite sides thereof are seated on these cam surfaces. Accordingly, upon rotation of the post in one direction, the cam followers ride up the inclined cam surfaces and move the post axially against the thrust of the spring, whereupon the clamping force is lifted from the jaws and the disc 12 is free to rotate.

Obviously, for the described camming action to take place, it is essential that the block 32 be restrained against rotation. That is assured by the square shape of the block and the fact that the beam 16 is channel-shaped in cross section and has the block received between its flanges 36. The channel-shaped cross section of the beam also assures desired stiffness, and to prevent shifting of the block along the length of the beam, the block has a pilot boss 37 on its inner face that is received in the hole 27 in the beam — specifically in its web — through which the inner end of the post protrudes. Since the hole 27 in the beam and the bearing-forming hole 33 through the cam block are coaxial with the adjusting screw 30 projecting from the floating jaw 14 and the thrust receiving pad 29 in the lever, the entire force transmitting connection between the lever and the floating jaw has a common axis that passes perpendicularly through the disc.

Although the cam followers 35 that project radially from diametrically opposite sides of the post might take any suitable form, they are preferably ball bearings 38 mounted on a shaft or pin 39 that extends diametrically through a hole in the post. The inner races of these bearings snugly fit the shaft or pin 39, and their outer races ride on the inclined cam surfaces. Any suitable means — such as roll pins 40 driven through holes in the shaft or pin 39 — hold the ball bearings in place.

Attention is directed to the fact that the end portion 39a of the shaft or pin projects a substantial distance from the post. Post rotating torque applied to the extremity of this end portion of the pin is therefore significantly multiplied, making it possible to activate the cam means and release the brake by a relatively light force. While that force can be supplied in any desired way, in keeping with the general objective of the invention — a spring-engaged, electromagnetically-disengaged brake — that force is obtained by an electromagnet 45 mounted on the base plate 8 and having its armature 46 operatively connected with the extremity of the long end portion 39a, as at 47.

It will no doubt be realized that although travel of the armature 46 in moving to its "home" position is not very great, and that because of the long leverage through which that motion is converted into rotation of the post, the angle through which the post is turned is relatively small, but nevertheless ample to activate the cam means and thereby effect disengagement of the brake.

Although not illustrated in the drawings, it will be understood that if greater braking torque that can be obtained by gripping a single rotating disc is required, a second — and even a third — such disc can be added in the manner illustrated and described in the Stearns U.S. Pat. No. 2,620,901, since in any case the disc or discs are gripped or clamped between the inner fixed jaw 13 and the outer floating jaw 14.

Those skilled in the art will appreciate that the invention can be embodied in forms other than as herein disclosed for purposes of illustration.

The invention is defined by the following claims:

I claim:

1. In a brake of the character described, wherein a chordal portion of rotating disc means is gripped between non-rotating inner and outer jaws that are substantially symmetrically disposed with respect to an axis passing perpendicularly through the disc means, the improvement which comprises:

A. rigid structure including overlying spaced apart inner and outer members, the inner one of which is fixed with respect to the inner one of said jaws, and both of said members being intersected by said axis;

B. means on the inner one of said overlying members floatingly holding the outer jaw in position;

C. a lever having a medial portion intersected by said axis and disposed outwardly of the outer one of said overlying members;

D. means hingedly connecting one end portion of the lever with said rigid structure and providing for swinging movement of said medial portion of the lever towards and from the jaws;

E. a post passing through a hole in the outer one of said overlying members and extending along said axis and axially interposed between the medial portion of said lever and the outer jaw to form a force transmitting connection between said lever and said outer jaw and through which said force acts to energize the brake;

F. cam means arranged to react between said post and the outer one of said overlying members of the rigid structure and upon activation thereof to impart brake releasing motion to said post; and G. means for activating said cam means.

2. The invention defined by claim 1, wherein said cam means comprises:

1. means forming an inclined cam track fixed with respect to the outer one of said overlying members of the rigid structure and positioned adjacent to said post, and 2. cam follower means having a force transmitting connection with said post and arranged to ride on said cam track, and wherein the means for activating the cam means comprises 1. an arm connected with said cam follower means and operable upon movement in one direction to cause the cam follower means to move up said inclined cam track, and 2. remotely controllable power means operatively connected with said arm to move the same in said direction.

3. The invention defined by claim 1, wherein said cam means includes means on the outer one of said overlying members of the rigid structure providing a bearing coaxial with said axis and also providing an inclined cam track contiguous to said bearing, wherein said post is slidably and rotatably received in said bearing and has a hole extending diametrically therethrough at a location between said cam track and said lever, and wherein said cam means further includes:

1. a pin extending through said hole in the post, and 2. a roller on said pin in position to ride up said inclined cam track upon rotation of the post in one direction; and wherein said means for activating the cam means comprises motion producing means operatively connected with an extended end portion of said pin to impart rotation to the post in said direction.

4. The invention defined by claim 3, wherein said inclined cam track is duplicated at diametrially opposite sides of the post, wherein said pin projects in both directions radially from the post, and wherein said pin has a roller mounted thereon at each of said sides of the post to ride on said inclined cam tracks.

5. The invention defined by claim 1, wherein the outer one of said overlying members of said rigid structure is a beam that is channel-shaped in cross section and has a hole through its web in line with said axis; wherein said cam means includes 1. a block non-rotatably seated in the channel-shaped beam with one face thereof facing said lever, said block having a bearing-forming hole therethrough coaxial with said axis, the post being freely rotatably and axially movably received in said bearing-forming hole and having a portion thereof spanning the distance between said face of the block and said lever, the end of said portion of the post bearing against the lever;

2. means on said face of the block forming an inclined cam track, and 3. cam follower means projecting radially from the post and held against said inclined cam track by said force so that upon rotation of the post in one direction the cam follower means rides up said inclined track and thereby relieves the outer jaw of said forces; and wherein said means for activating the cam means comprises 1. an arm projecting radially from the post, and 2. remotely controllable motion producing means operatively connected with the outer end of said arm to impart rotation to the post in said direction.

6. The invention defined by claim 5 wherein said arm is an end portion of a pin that extends diametrically through the post, and said inclined track is duplicated at diametrically opposite sides of the bearing-forming hole through said block, and wherein said cam follower means comprises two rollers on said pin, one at each side of the post, and each positioned to ride on the adjacent inclined track.

7. The invention defined by claim 1, wherein said means on the inner one of said overlying members of the rigid structure by which the outer jaw is floatingly held in position is a hole through said inner one of the overlying members in which the outer jaw is floatingly received.

8. Mechanism to control rotation of the shaft of an electric motor comprising the combination of:

A. a mounting plate securable to the housing of the motor and having a hole therethrough to accommodate the shaft of the motor;

B. a disc having a torque transmitting connection with the motor shaft and located at one side of the mounting plate;

C. a pair of elongated bar-like jaws, one fixed and the other floating, between which a chordal portion of the disc is gripped to stop rotation of the motor shaft;

D. means mounting the fixed one of said jaws on the mounting plate at said side thereof;

E. the mounting plate having a hole therethrough in line with said fixed jaw, of a size to receive the floating jaw and floatingly hold it in opposing relationship to said fixed jaw;

F. a pair of studs fixed to the mounting plate and projecting from the other side thereof, one near each end of said hole therethrough;

G. a rigid beam secured to said studs in overlying relation to said floating jaw;

H. a lever overlying said beam with its ends adjacent to said studs;

I. means hingedly connecting one end of said lever with the adjacent stud;

J. a spring on the other stud urging the lever towards the beam;

K. force transmitting means interposed between said lever and the floating jaw through which said spring acts to force the floating jaw towards the fixed jaw and thereby grip the adjacent portion of the disc therebetween;

L. cam means reacting between the beam and lever and operable when activated to relieve the floating jaw of the force of said spring;

M. and remotely controllable means for activating said cam means.

9. The invention defined by claim 8, wherein said force transmitting means includes a rotatable and axially movable post that passes through a hole in said beam and has one end thereof at all times connected with said lever so that any movement of the lever is imparted to the post, the length of said post being such that force transmitting relationship between its other end and the floating jaw depends upon the axial position of the post and wherein said cam means comprises:

1. inclined track means fixed with respect to said beam, and
2. cam follower means projecting radially from the post and seated on the inclined track means so that rotation of the post in one direction causes the cam follower means to ride up said inclined track means and thereby move the post axially in the direction away from the floating jaw.

10. The invention defined by claim 9, wherein the post has a hole diametrically through a portion thereof that spans the distance between said inclined track means and the lever, and wherein said cam follower means comprises a pin extending through said hole, and a roller on said pin in position to ride on said inclined track means.

11. The invention defined by claim 12, wherein said inclined track means is duplicated at opposite sides of the post and the pin has two rollers thereon, one at each side of the post.

12. The invention defined by claim 11, wherein the means for activating the cam means is an electromagnet mounted on the mounting plate and having an armature operatively connected with said pin.

13. The invention defined by claim 12, wherein said pin has two end portions projecting from the post, each of which has one of the rollers mounted thereon, and wherein one of said end portions is considerably longer than the other, and the electromagnet armature is connected with the extremity of said longer portion.

* * * * *

UNITED STATES PATENT OFFICE
CERTIFICATE OF CORRECTION

Patent No. 4,022,301         Dated  May 10 1977

Inventor(s)  QUINTEN A. HANSEN

It is certified that error appears in the above-identified patent and that said Letters Patent are hereby corrected as shown below:

| | |
|---|---|
| Col. 4: | Line 20, "the" should precede "travel" |
| | Line 29, "that" should be "than" (second occurrence) |
| Col. 5: | Line 47, "opposite" should precede "sides" |
| Col. 6: | Line 2, "forces" should be "force" |
| Col. 8: | Line 3, "12" should be "10" |

Signed and Sealed this

Eighteenth Day of October 1977

[SEAL]

Attest:

RUTH C. MASON
Attesting Officer

LUTRELLE F. PARKER
Acting Commissioner of Patents and Trademarks